United States Patent [19]

Furlani

[11] Patent Number: 4,646,686
[45] Date of Patent: Mar. 3, 1987

[54] SELECTIVE BIRD FEEDER

[76] Inventor: Walter Furlani, 69 Pleasant Ridge Dr., Poughkeepsie, N.Y. 12603

[21] Appl. No.: 762,433

[22] Filed: Aug. 5, 1985

[51] Int. Cl.[4] .............................................. A01K 39/01
[52] U.S. Cl. ..................................... 119/51 R; 119/63
[58] Field of Search .................... 119/51 R, 52 R, 63, 119/70

[56] References Cited

U.S. PATENT DOCUMENTS

| 2,965,070 | 12/1960 | Myrick | 119/51 R |
| 3,126,870 | 3/1964 | Matthew | 119/51 R |
| 3,145,690 | 8/1964 | Bachman | 119/51 R |
| 4,323,035 | 4/1982 | Piltch | 119/51 R |

Primary Examiner—Gene Mancene
Assistant Examiner—David I. Tarnoff
Attorney, Agent, or Firm—Joseph L. Spiegel

[57] ABSTRACT

A selective bird feeder has a cylindrical, transparent feed container located inside a concentric, coaxial, transparent shroud. The shroud is supported on the container by a spring for movement between a bird feeding position and a position in which heavier birds or animals cause the shroud to block access to the feed. Perches are supported on the shroud adjacent access openings in the shroud and container. Light birds can obtain feed through the openings while heavier ones or animals cannot.

11 Claims, 5 Drawing Figures

U.S. Patent  Mar. 3, 1987  4,646,686
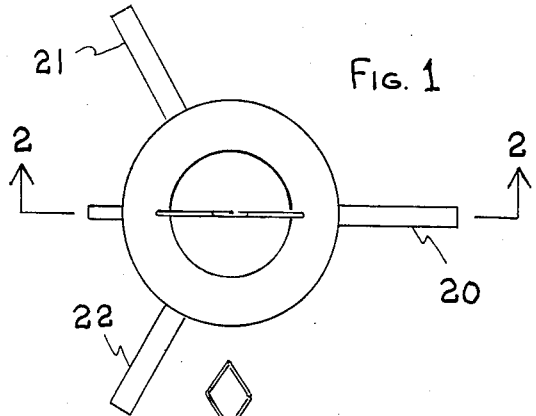
FIG. 1
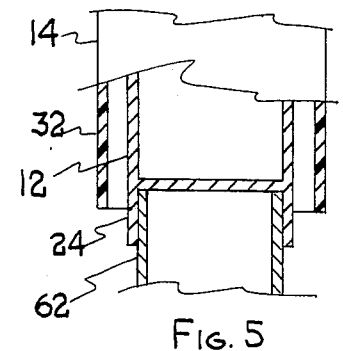
FIG. 5
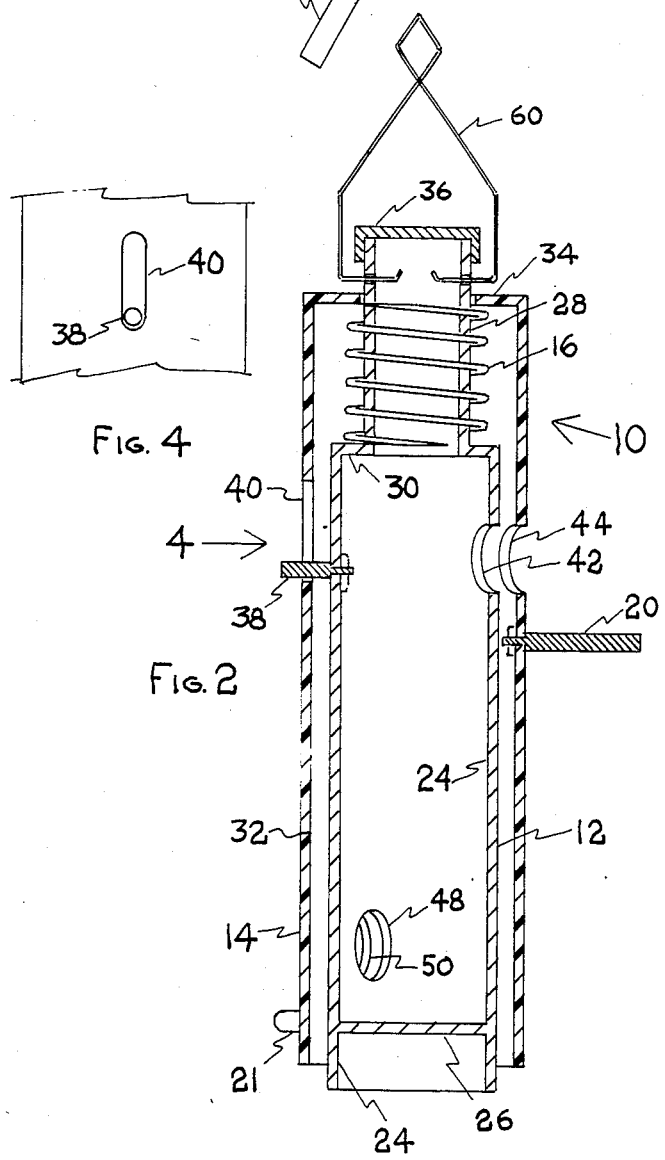
FIG. 4
FIG. 2
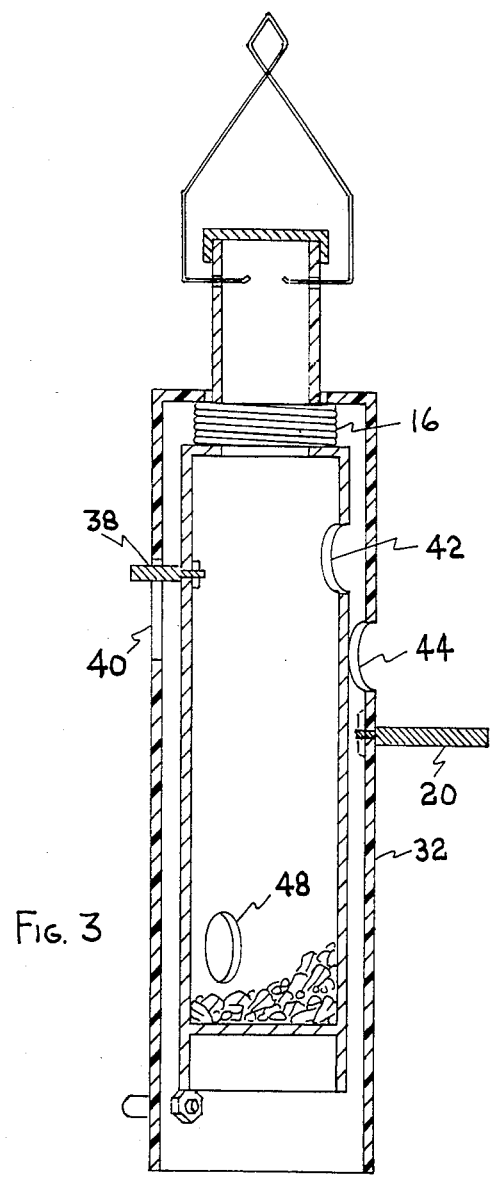
FIG. 3 ved with openings. The chicken raiser can position the plate to accommodate the growth of the size of a baby chick's head while preventing the whole chick from entering the feeding trough.

SELECTIVE BIRD FEEDER

This invention relates to selective bird feeders, i.e., bird feeders which are selective in the sense that only birds of less than a predetermined weight can gain access to bird seed or feed within the feeder.

BACKGROUND AND PRIOR ART

Many persons who feed birds want to use a bird feeder that is selective as to the maximum size of a bird that is able to extract feed from a feeder. This limitation or selection thereby excludes larger size birds and animals, such as squirrels, which tend to frighten away smaller birds and consume quantities of feed in excess of that which a person desires to make available.

The above described problem or objective is known in the prior art and several patents disclose feeders which accomplish such objective in ways different from each other and from the invention described in detail hereinafter. U.S. Pat. No. 3,145,690—Bachman describes a bird feeder in which an inverted cylindrical hopper is suspended over a feeding pan so that feed from the hopper automatically fills the pan as the feed is consumed. A bird perch surrounds the pan and is attached to a conical shroud. Both the perch and the shroud are supported by a compression spring whereby heavier birds or animals on the perch cause the shroud to move downwardly and cover the feed pan.

U.S. Pat. No. 3,126,870—Matthew discloses a selective bird feeder in which a somewhat intricately shaped feed hopper has two side openings through which feed can be accessed. A cylindrical shroud surrounds the hopper and is mounted for rotation about a horizontal axis under the bias of a weight. The shroud has two openings normally aligned with the hopper access openings but which become misaligned, when a large bird perches on the shroud, to preclude access to the feed.

As will be apparent from the more detailed discussion below, the design of the bird feeder of the invention can be characterized as being very simple in shape with the advantage of being low cost to make or manufacture. Several patents disclose selective bird feeders which have more elaborate designs and operate in different ways. The following patents all show feeders having a box-like construction using some form of a shroud or shutter connected to a lever and which is actuated under the weight of a heavy bird to close access to feed: U.S. Pat. No. 3,104,649—Slaven, U.S. Pat. No. 3,124,103—Stainbrook, U.S. Pat. No. 3,241,525—Meier.

Also, the invention includes an inner feed hopper surrounded by a movable shroud which has openings therein that are normally aligned permitting access to the feed by lighter birds but which become misaligned to preclude access to the feed by heavier birds or animals. Two patents U.S. Pat. No. 1,404,251—Westenberger et al. and U.S. Pat. No. 3,738,329—Schweitzer describe bird (poultry) feeders that make use of aligned openings for controlling access to feed, but neither discloses using the weight of a bird to control the alignment of the openings. U.S. Pat. No. 1,404,251—Westenberger et al. shows a feeder having a handle attached to a shroud allowing the chicken raiser to open or close the feeder and control when the chickens will have access to the feed. U.S. Pat. No. 3,738,329—Schweitzer discloses a trough feeder having a movable plate pro-

SUMMARY OF THE INVENTION

One of the objects of the invention is to provide a bird feeder that is simple in design and can be manufactured at low cost while being effective to selectively limit access to bird feed in accordance with the weight of a bird.

Another object is to provide a bird feeder which allows both people and birds to readily see any bird feed within the feeder.

Briefly, a bird feeder in accordance with the invention has a vertical cylindrical hopper provided with at least one side opening. A cylindrical concentric shroud is mounted on the hopper for movement relative thereto under the bias of a compression spring. The shroud has an opening alignable with the hopper opening. A bird perch is attached to the shroud whereby heavier birds or animals cause the shroud to move down and misalign the openings to preclude access to the feed while allowing lighter birds to obtain feed through the normally aligned openings.

BRIEF DESCRIPTION OF THE DRAWINGS

Other objects and advantages of the invention will be apparent from the following description taken in connection with the accompanying drawings herein:

FIG. 1 is a top plan view of a bird feeder embodying the invention;

FIG. 2 is a vertical section view along reference lines 2—2 of FIG. 1, showing the relationship of the parts in the normal feeding position;

FIG. 3 is a view similar to FIG. 2 showing the relationship of the parts in the non-feeding position;

FIG. 4 is a side elevational view, viewed in the direction of reference line 4 in FIG. 2, of a detail; and, FIG. 5 is a front elevational view, partly in section, of a modification.

DESCRIPTION OF THE PREFERRED EMBODIMENTS

Referring now to FIGS. 1 and 2, of the drawings, a bird feeder 10 comprises a hopper or container 12 for holding a supply of bird seed or feed. Container 12 is adapted to be supported in a vertical position and generally lies inside of a shroud 14. A coil compression spring 16 is mounted on container 12 and supports shroud 14 on the container 12 for movement between the two positions shown in FIGS. 2 and 3 as described below. Three feeding rungs or bird perches 20, 21 and 22 are mounted on shroud 14 and are spaced equiangularily relative to the shroud axis and longitudinally therealong so as to afford access to bird seed at different levels in the container. Both container 12 and shroud 14 are made of transparent plastic to allow external observation of the feed and level thereof.

Container 12 is in the form of a right angle cylinder having a circular cross section about a vertical axis. Container 12 has a lower portion or sidewall 24 the bottom of which is closed by a circular plate or wall 26. An upper portion or sidewall 28 is of a smaller diameter than lower portion 24 and is joined thereto by a circular, ring shaped shoulder 30. The total length of container 12 is roughly four times the diameter of portion 24 to accommodate sufficient quantity of feed.

Shroud 14 is also cylindrically shaped in the form of a right angle cylinder of circular cross section and has a diameter greater than that of container 12. Shroud 14 has a sidewall 32 open at its lower end. The upper end of sidewall 32 is connected to and integral with a ring shaped upper end wall 34 that overlies and is spaced from shoulder 30. Spring 16 extends between and biases partly the upper surface of shoulder 30 and the lower surface of shoulder 34. Portion 28 extends through and above wall 34 and is open to provide an opening through which feed can be placed or poured into container 12. A removable cap 36 fits over the upper end of portion 28. A retainer pin 38 is connected to or mounted upon container 12 and extends radially outwardly through a slot 40 in sidewall 32. The endwalls of slot 40 limit relative movement between elements 12 and 14 and define the two limit or end positions of movement of shroud 14 relative to container 12. Pin 38 also prevents relative rotation between container 12 and shroud 14 and holds such parts together with spring 16 therebetween.

Container 12 has an access opening 42 which cooperates with a similarly shaped hole or opening 44 in shroud 14 to control access therethrough to the feed. Openings 42 and 44 are circular and each have a diameter sufficient to allow small birds to peck at and reach feed immediately inside of hole 42. Perch 20 is located beneath hole 44 at a distance affording small birds suitable room to stand thereon while feeding. Access openings 48 and 50 in container 12 and shroud 14 are located near the bottom of feeder 10 and are associated with perch 21 to allow birds to feed there particularly when the level of feed in container 12 is low. Perch 22 is located vertically between perches 20 and 21 and is adjacent access openings (not shown) similar to 42, 44, 48 and 50, to allow birds to feed while standing on perch 22.

Feeder 10 is intended to be supported or hung in a vertical position. To accomplish this, feeder 10 is provided with one or both of a wire hanger 60 attached to the upper end of container 12 and/or a post 62 (FIG. 5) fitted into the lower end of sidewall 24.

Spring 16 has a diameter between those of portions 28 and 32 and is coaxial therewith. The free length of spring 16 is equal to or slightly greater than the length of movement of shroud 14 between the two limit positions. Spring 16 also has a spring constant chosen to accommodate the sizes of the birds desired to obtain feed. When the shroud is in the position shown in FIG. 2, spring 16 is compressed slightly to bear the weight of shroud 14 and perches 20, 21 and 22. Spring 16 can be precompressed to force pin 38 against the lower end of slot 40, the precompression being sufficient that no movement of shroud 14 will occur unless the weight of a bird or birds on the perches exceeds a predetermined value. The spring constant of spring 16 and the diameter of the access holes, determines the predetermined weight of a bird which will close or vertically misalign the access openings and prevent access to feed.

To use feeder 10, it must first be supported in a vertical position by hanger wire 60 or container 12 being attached to a suitable post 62. Cap 36 is then removed and container 12 filled with feed. Light birds can then feed at any one or all perches. As the level of feed falls, such feeding will be limited to the lower perches. In the normal feeding position shown in FIG. 2, all of the access holes in container 12 are aligned and concentric with the corresponding access holes in shroud 14. When the weight of birds or animals on the perches exceeds a predetermined level, shroud 14 moves downwardly to the position shown in FIG. 3 wherein the shroud or sidewall 32 completely covers the access openings in container 12 to preclude access to the feed. In such position, spring 16 is substantially fully compressed.

The above-described feeder has several advantages. There are few moving parts and no close tolerances so the feeder is reliable and should have a long life. The parts have 2 simple shapes and are low in number so the feeder is relatively inexpensive to manufacture. Cap 36 covers or overlies exposed feed in container 12 and prevents vertically falling rain from directly wetting the feed.

It should be apparent to those skilled in the art that changes can be made in the details and arrangements of parts without departing from the invention as defined in the claims.

What is claimed is:

1. A selective bird feeder allowing birds and animals of less than a predetermined weight to obtain feed from the feeder while preventing birds and animals greater than said predetermined weight from accessing feed in the feeder, comprising:

a feed container adapted to be supported in a vertical position and having a cylindrical tubular side wall of circular cross section and uniform diameter throughout its length, said container further having an end wall closing the bottom of said side wall to support feed within said container, said side wall being open at its top to allow feed to be placed in said container, said side wall having a first access opening therein of a size permitting the head of a small bird to gain access to feed within said container;

a spring connected to and supported by said container; a cylindrical tubular shroud coaxially surrounding said container, said shroud having a circular cross section of a uniform diameter greater than said diameter of said sidewall, said shroud being connected to and supported on said spring for linear vertical movement relative to said container under the bias of said spring between an upper first position and a lower second position, said shroud having a second access opening of a size and shape substantialy the same as that of said first access opening, said second access opening being located so as to be aligned with said first access opening when said shroud is in said first position so as to afford access through the aligned openings to feed within said container, downward movement of said shroud from said first position being effective to progressively position said second opening alongside of radially adjacent portions of said side wall whereby such portions block access to feed in said container through said second opening;

and a bird perch connected to said shroud adjacent to said second opening for supporting birds thereon and transmitting the weight of any bird to said shroud whereby birds and animals heavier than a predetermined weight cause said shroud to move downwardly against the bias of said spring into said second position;

said first and second openings each having a size and said spring a having a constant such that only birds and animals of less than a predetermined weight can gain access through said first and second openings to feed in said container.

2. The combination of claim 1 wherein said shroud and said container are of transparent materials permitting feed in said feeder to be observed from outside said feeder.

3. The combination of claim 1 wherein said container has an upper cylindrical portion of reduced diameter relative to said sidewall and provides a fill opening at its upper end, and an upwardly facing shoulder between said sidewall and said upper cylindrical portion, said shroud having an end wall overlying said shoulder, said spring being a compression coil spring located between and bearing against said shoulder and said overlying end wall.

4. The combination of claim 3 including means for limiting movement of said shroud beyond said first and second positions.

5. The combination of claim 4 wherein said limiting means is further operative to prevent any relative rotation between said shroud and said container.

6. The combination of claim 5 wherein said limiting means comprises a slot in one of said container or said shroud, and a pin attached to the other one of said container and said shroud, said slot having a length controlling the locations of said first and second positions and the amount of relative movement therebetween, said slot having a length approximately the same as those of said access openings.

7. The combination of claim 3 comprising a cap mounted on said container and covering said fill opening.

8. The combination of claim 3 wherein said end wall of said shroud is ring shaped having a central opening through which said upper cylindrical portion extends.

9. The combination of claim 4 wherein said spring is precompressed to a predetermined extent preventing movement of said shroud from said first position by birds of less than a second predetermined weight.

10. The combination of claim 1 comprising additional access openings in said shroud and container located equiangularly spaced from said first and second access openings and at different vertical positions therefrom.

11. The combination of claim 1 comprising hanger means allowing said feed container to be hung in said vertical position, and support means allowing said feed container to be supported on top of a post in said vertical position.

* * * * *